United States Patent Office 2,878,175
Patented Mar. 17, 1959

2,878,175
METHOD FOR ISOMERIZING POLYBUTADIENE

Morton A. Golub, Cuyahoga Falls, Ohio, assignor to The B. F. Goodrich Company, New York, N. Y., a corporation of New York No Drawing. Application February 11, 1957
Serial No. 639,196

14 Claims. (Cl. 204—160)

This invention relates to a method for isomerizing cis 1,4-structures in polybutadiene to trans 1,4-structures. The invention relates more specifically to the photoisomerization of cis 1,4-structures in polybutadiene to trans 1,4-structures exposing a solution of a polybutadiene, possessing cis 1,4-structures, and an organic sulfur compound to ultra-violet radiation.

When butadiene-1,3 is normally polymerized the butadiene molecules unite in both 1,4 and 1,2-structures, and in the 1,4 double bond units both cis and trans configurations occur. It is known, however, that butadiene-1,3 may be polymerized by means of certain heavy metal oxide and heavy metal organo-metallic catalysts to produce polymers containing varying proportions of 1,4-structures in cis configurations. My copending application, Serial No. 631,459, filed December 31, 1956, discloses that polybutadienes containing more than about 10% cis 1,4-structures may be photoisomerized in the presence of organic bromine compounds and the cis structures in excess of about 10% converted into trans 1,4-structures.

It has now been discovered, quite unexpectedly, that polybutadienes containing more than about 10% cis 1,4-structures may be photoisomerized in the presence of certain hereinafter defined organic sulfur compounds and the cis structures in excess of about 10% are readily converted into trans 1,4-structures. The process is readily controlled to obtain a degree of conversion of cis to trans as desired. In essence the process comprises exposing a solution of polybutadiene, containing more than about 10% cis 1,4-structures, and an organic sulfur compound to ultra-violet radiation. The process is effective so long as there is some polybutadiene which possesses more than about 10% cis 1,4-structures dissolved in a solvent in the presence of hereinafter defined organic sulfur compounds which are also at least partially soluble in the solvent and this mixture irradiated with ultra-violet.

The process of this invention is applicable to any polybutadiene regardless of how prepared which contains more than about 10% cis 1,4-structures containing double bonds and is at least partially soluble in a solvent. Most emulsion and/or free radical polymerized polybutadienes contain a very low concentration of cis structures and are not ordinarily employed in the process of this invention as are polybutadienes prepared with heavy metal organo-metallic catalysts which may result in polymers containing large amounts of cis 1,4-structures, often as high as about 95%. It will be understood, of course, that polybutadienes prepared with the usual free radical or other catalysts which do have cis 1,4-structures in amounts in excess of about 10% may have this excess isomerized by the process of this invention.

The organic sulfur compound ordinarily employed in the process of this invention is an organic sulfide, disulfide or mercaptan. Apparently any organic sulfide, disulfide or mercaptan is effective in the photoisomerization reaction, including both aliphatic and armoatic materials. All of the following listed compounds have been found to be useful in converting cis 1,4-structures to trans 1,4-structures in polybutadiene: ethyl disulfide, n-propyl disulfide, isobutyl disulfide, n-amyl disulfide, di-t-butyl disulfide, diphenyl disulfide, benzyl disulfide, di-p-tolyl disulfide, 4,4'-di-chloro-2,2'-dinitrodiphenyl disulfide, ethyl sulfide, n-propyl sulfide, allyl sulfide, n-butyl sulfide, isobutyl sulfide, ethyl-n-butyl sulfide, phenyl sulfide, benzyl sulfide, naphthyl sulfide, no-propyl mercaptan, butyl mercaptan, octyl mercaptan, dodecyl mercaptan, allyl mercaptan, thiophenol, thiocresol, propyl thiophenol, thio-beta-naphthol, benzyl mercaptan and the like. Mixtures of these and similar materials, of course, may be employed.

While the above listed organic sulfur compounds were found to effect the photoisomerization of cis to trans structures in polybutadiene, some of these materials are more efficient than others and smaller amounts and shorter reaction times may be employed with the more effective materials. For example, diphenyl disulfide, thio-beta-naphthol, phenyl sulfide, benzyl disulfide, allyl mercaptan, thiophenol, n-propyl mercaptan and phenyl ethyl sulfide are quite efficient. Aromatic disulfides, sulfides and mercaptans are found to be the most efficient class of materials and diphenyl disulfide and thio-beta-naphthol are the most efficient of the materials tested.

The amount of organic sulfide, disulfide or mercaptan employed and the time of exposure of the polybutadiene solution to a constant ultra-violet source will depend upon the desired degree of cis to trans conversion and the efficiency of the particular organic sulfur compound employed. Ordinarily the degree of photoisomerization is directly proportional to the concentration of the organic sulfur compound. The minimum and maximum effective amounts will vary with different materials and this can be determined readily by those skilled in the art with reference to the examples given hereinafter. An amount of organic sulfur compound greater than about 0.01 gram per gram of polybutadiene has been found to be effective to obtain measurable photoisomerization in reasonable reaction times. Under the influence of a 1400 watt mercury resonance lamp 12 inches from the surface of the solution, under equivalent conditions, better results are ordinarily obtained with greater than about 0.05 gram of organic sulfur compound per gram of polybutadiene.

The time of irradiation for a mixture containing a given organic sulfur compound at a given concentration to obtain a desired degree of cis to trans conversion is directy proportional to the intensity, and inversely proportional to the square of the distance, of the ultra-violet source. With a constant source of radiation the degree of conversion ordinarily is proportional to the time of exposure with each organic bromine compound as can be determined with reference to the specific examples. Ultra-violet radiation from any source may be employed including mercury lamps, carbon arcs and even RS Sunlamps although in the case of the latter the reaction would be slower. Irradiation in the effective wave length of ultra-violet in the range of the 1850 to 4000 angstroms, which is readily provided by mercury resonance lamps, has been found to be quite satisfactory. In the case of some of the more active materials such as thiophenol, thio-beta-naphthol and diphenyl disulfide, the effective range of radiation can be extended to about 5500 angstroms but more efficient conversions are obtained in the shorter wave length range of ultra-violet.

The amount and ratio of cis to trans structures in treated polybutadiene is determined readily by infrared analysis from spectra of the irradiated samples. It is obvious that the man skilled in the art can readily determine, once it is decided what percent conversions of cis to trans conversion is desired (the ratio of cis and trans structures desired in the end product), the type and amount of organic sulfur compound to use and the time and degree of exposure.

The solvent used is one in which the polybutadiene and the sulfur-containing organic compound should be at least partially soluble. Preferably the solvent used is one in which the polybutadiene and organic sulfur compound are completely soluble for most efficient operation of the photoisomerization reaction. Any of the usual solvents for polybutadiene may be employed and aromatic hydrocarbons such as benzene and toluene, hexane, chlorobenzene, dichlorobenzene, carbon tetrachloride and and the like will be found to be useful. For most efficient operation of the process, the amount of polybutadiene dissolved in a given quantity of solvent is kept at a low figure. Better results are ordinarily obtained when less than about 2% solutions of polybutadiene in solvent are employed. Although solutions of higher concentrations may be used, some difficulty may be experienced with gelation which may complicate but not preclude rapid recovery of the photoisomerized polymer. Of course solutions of very low concentrations may be employed. Very efficient transformations are obtained in about 0.1 to about 1.5% solutions of polybutadiene in benzene when the polybutadiene has a molecular weight of about 200,000 to about 700,000. The process is applicable, of course, to any polybutadiene having molecular weights lower and higher than this figure so long as the polybutadiene contains more than about 10% cis 1,4-structures and is soluble in a solvent.

The temperature at which the photoisomerization is conducted may be varied quite widely. Room temperature is quite satisfactory and although radiation by ultra-violet may increase the temperature of the solution, this has no apparent adverse effect on the process. Generally the ultimate cis/trans ratio is independent of isomerization temperature over the range of about 5 to 70° C. With some materials, such as diphenyl disulfide, heat accelerates the photoisomerization reaction. The temperature at which the photoisomerization is conducted may be varied from just above freezing point of the solvent to the boiling point of the solvent, or even higher if the system is under pressure so that the solvent remains liquid.

It is preferred that the photoisomerization be conducted in an inert atmosphere in the absence of oxygen. When oxygen is present, dissolved either in the solvent or in the atmosphere above the solution, degradation of the polybutadiene is often noted with consequent lowering of molecular weight. Therefore, precautions should be taken to exclude oxygen from the reaction system if it is desired that the molecular weight of the polybutadiene not be lowered. It is not essential that every trace of oxygen be removed but reasonable and practical steps to eliminate oxygen ordinarily should be taken. Of course, if it is desired or not objectionable to obtain a polymer with lower molecular weight, then small amounts of oxygen may be present.

The container for the reaction mixture should be transparent to ultra-violet and may be Pyrex and the like but is preferably quartz. The solutions also may be exposed directly to ultra-violet radiation in suitable reactors with the radiation source directly over the surface of the solution. The process is readily adaptable to continuous and flowing film processes.

In the examples which follow, the same general experimental procedure as now set forth was employed. A solution of polybutadiene in benzene is placed in a one inch diameter tube. An organic sulfur compound is added to the solution. The tube is flushed with nitrogen and sealed. The tube is then placed about 12 inches from a 1400 watt mercury resonance lamp and irradiated for a period of time. At the end of the radiation period the polymer is recovered from the benzene solution by precipitation with methanol, the coagulum is washed with methanol and air dried. The samples in each case are analyzed for cis/trans ratio by infrared absorption. The recovered polymers may be compounded and vulcanized by normal rubber and plastic processing techniques.

Example I 8 ml. of phenylethyl sulfide was mixed with 40 ml. of a 1.2% solution of polybutadiene in benzene. The polybutadiene had an initial cis/trans ratio of 95/5 and a molecular weight of approximately 700,000. This solution was irradiated in a quartz test tube for 2½ hours at room temperature. The temperature of the solution during irradiation was about 45° C. The recovered polymer had a cis/trans ratio of 29/71 and unlike the original polybutadiene, which was quite rubbery and soft, the photoisomerized product was fairly tough. When purified, this polymer was found to be essentially sulfur-free. The unsaturation of the polymer prior to irradiation was 388 by iodine number and 385 by iodine number after treatment, this difference being well within the experimental error of the iodine number test. The molecular weight of the polymer as determined by dilute solution viscosity was substantially unchanged by the photoisomerization reaction. This polymer may be molded and vulcanized. When the above example was repeated at a temperature of about 15° C., a product having a cis/trans ratio of about 13/87 was obtained. When the above example is repeated at about 85° C., a product having a cis/trans ratio of about 24/76 was obtained.

Example II 0.5 g. of diphenyl disulfide was dissolved in 40 ml. of a 1.2% solution of polybutadiene in benzene. The polybutadiene had an initial cis/trans ratio of 95/5 and a molecular weight of approximately 700,000. This solution was irradiated in a Pyrex test tube for 4 hours at room temperature. The temperature of the solution during irradiation was about 50° C. The recovered polymer had a cis/trans ratio of 12/88 and unlike the original polybutadiene, which was quite rubbery and soft, the photoisomerized product was tough. When purified, this polymer was found to be essentially sulfur-free. The unsaturation of the polymer prior to irradiation was 388 by iodine number and 394 by iodine number after treatment. The molecular weight of the polymer as determined by dilute solution viscosity was substantially unchanged by the photoisomerization.

Example III 5 ml. of thiophenol was mixed with 40 ml. of a 1.2% solution of polybutadiene in benzene. The polybutadiene had an initial cis/trans ratio of 95/5 and a molecular weight of approximately 700,000. This solution was irradiated in a Pyrex test tube for 4 hours at room temperature. The temperature of the solution during irradiation was about 50° C. The recovered polymer had a cis/trans ratio of 25/75 and the photoisomerized product was tough. When carefully purified, this polymer was found to be essentially sulfur-free. The unsaturation of the polymer prior to irradiation was 388 by iodine number and 383 by iodine number after treatment. When the above example was repeated at a temperature of 10° C., a product having a cis/trans ratio of 27/73 was obtained. When the above example was repeated at about 85° C., a product having a cis/trans ratio of about 16/84 was obtained.

Example IV 40 ml. portions of a 1.2% benzene solution of polybutadiene rubber with an initial cis/trans ratio of 53/47 were placed in Pyrex test tubes and the amounts set forth below of the listed organic sulfur compounds were added to the solutions. The solutions of polymer were exposed to ultra-violet radiation for 16 hours. The irradiations were conducted at room temperature.

| | Percent 1,4 structures as trans |
|---|---|
| Original polymer | 47 |
| 8 ml. n-amyl disulfide | 57 |
| 8 ml. di-p-tolyl disulfide | 84 |
| 8 ml. ethyl disulfide | 54 |
| 8 ml. isobutyl disulfide | 59 |
| 8 ml. di-tert-butyl disulfide | 52 |
| 8 ml. n-propyl disulfide | 62 |
| 0.5 g. 4,4'-dichloro-2,2'-dinitrodiphenyl disulfide | 56 |
| 0.5 g. benzyl disulfide | 70 |
| 8 ml. ethyl-n-butyl sulfide | 56 |
| 8 ml. phenyl sulfide | 80 |
| 8 ml. isobutyl sulfide | 53 |
| 8 ml. n-propyl sulfide | 59 |
| 8 ml. allyl sulfide | 56 |
| 0.5 g. benzyl sulfide | 83 |
| 8 ml. ethyl sulfide | 52 |
| 1 g. thio-B-naphthol | 91 |
| 8 ml. n-propyl mercaptan | 82 |
| 8 ml. ethyl thiocyanate | 60 |
| 8 ml. allyl mercaptan | 75 |
| 8 ml. allyl isothiocyanate | 58 |
| 0.5 g. 2-methyl benzothiazole | 52 |
| 0.5 g. p-toluene sulfonyl chloride | 65 |
| 0.5 g. m-nitrobenzene sulfonyl chloride | 55 |

*Example V*

40 ml. portions of a 0.7% solution of polybutadiene rubber in benzene containing various amounts of thio-beta-naphthol as set forth below were prepared and exposed at 6 inches to ultra-violet radiation from a mercury resonance lamp. The rubber had an initial cis/trans ratio of 95/5. The percent trans 1,4-content of the samples after various times of exposure are set forth in the table below:

| Thio-beta-naphthol, grams | 0.05 | 0.1 | 0.2 | 0.3 |
|---|---|---|---|---|
| | Percent 1,4-Structures as Trans | | | |
| Exposure, Hours: | | | | |
| 0.5 | 11 | 14 | 18 | 20 |
| 1.0 | 20 | 24 | 26 | 28 |
| 1.5 | 28 | 31 | 33 | 36 |
| 2.0 | 36 | 40 | 43 | 45 |
| 2.5 | 48 | 50 | 50 | 53 |
| 3.0 | 54 | 58 | 60 | 64 |

It is obvious from the above that the degree of photoisomerization obtained may be varied by time of exposure to a constant source of irradiation and by selection of the organic sulfur compound. The degree of isomerization obtained at a given time and with a given organic sulfur compound may be also varied to some degree by decreasing or increasing the amount of the particular organic bromine compound selected.

*Example VI*

40 ml. portions of a 1.2% polybutadiene solution in benzene, each containing 0.75 g. of diphenyl disulfide, were irradiated for 2½ hours with various portions of the mercury lamp spectrum. The rubber had an initial cis/trans ratio of 95/5. The percent trans 1,4-content of the samples after the various exposures are set forth in the table below:

| Range of Wave Length | Effective Wave Lengths | Percent Transmittance of Effective Wave Lengths | Percent 1,4-Structures as Trans |
|---|---|---|---|
| 4,600-6,000 | 5,461, 5,780 (optical filter) | 90 | 25 |
| 3,800-5,200 | 4,047, 4,358 (optical filter) | 10 | 42 |
| 3,000-6,000 | 3,131, 3,654 and the above | 95 | 90 |
| 2,200-6,000 | 2,537 in addition to the above | 95 | 90 |

It is obvious from the above table that photoisomerization of a polybutadiene solution containing diphenyl disulfide can be effected by irradiation in the visible range of the spectrum. However, the ultra-violet region of the spectrum is photochemically much more efficient for the process of this invention.

*Example VII*

40 ml. portions of a 1.2% polybutadiene solution in benzene, each containing 1 g. of diphenyl disulfide, were treated variously for 5 hours with heat and light as indicated in the table below. The initial cis/trans ratio of the rubber was 95/5 and the percent trans 1,4-contents of the polybutadiene following these treatments are set forth in the table.

| Treatment: | Percent 1,4-structure as trans |
|---|---|
| 1. No heat, solution in dark | 5 |
| 2. No heat, solution exposed to daylight | 43 |
| 3. Heat to 60-70° C. in dark | 5 |
| 4. Heat to 60-70° C. in daylight | 56 |

As shown in Example VI, radiation in the visible range with this material is effective in promoting cis to trans conversion. Evidently, heat catalyzes the photoisomerization of the polybutadiene when diphenyl disulfide is present.

The photoisomerized polybutadiene products of the process of this invention will range from rubbery to hard, tough materials depending upon the amount of trans 1,4-structures in the final product as will be understood by those skilled in the art. As such, these materials may be put to any use and application as is the practice with both rubbery and balata-like polybutadiene polymers.

It will be apparent to the man skilled in the art that many modifications of the invention in addition to the embodiments set forth in the examples may be made and it is intended that the invention be limited solely by the scope of the appended claims.

I claim:

1. A method for isomerizing cis 1,4-structures in polybutadiene to trans 1,4-structures which comprises exposing to ultra-violet radiation a solution of a polybutadiene possessing more than about 10% cis 1,4-structures said solution containing more than .01 g. per gram of polybutadiene of an organic sulfur compound selected from the class consisting of organic sulfides, organic disulfides, and organic mercaptans.

2. The method of claim 1 wherein the organic sulfur compound is an aromatic sulfide.

3. The method of claim 1 wherein the organic sulfur compound is an aromatic disulfide.

4. The method of claim 1 wherein the organic sulfur compound is an aromatic mercaptan.

5. The method of claim 3 wherein the aromatic disulfide is diphenyl disulfide.

6. The method of claim 4 wherein the aromatic mercaptan is thio-beta-naphthol.

7. A method for isomerizing cis 1,4-structures in polybutadiene to trans 1,4-structures which comprises exposing to ultra-violet radiation a solution of a polybutadiene elastomer possessing from 50 to about 95% cis 1,4-structures dissolved in an organic solvent of a concentration of about 0.1 to about 2% polybutadiene in solution said solution containing more than about 0.05 gram per gram of polybutadiene of an organic sulfur compound selected from the class consisting of organic sulfides, organic disulfides and organic mercaptans at a temperature within the range that said solution is liquid.

8. The method of claim 7 wherein the organic sulfide is phenyl sulfide.

9. The method of claim 7 wherein the organic mercaptan is an alkyl mercaptan.

10. The method of claim 7 wherein the organic mercaptan is thiophenol.

11. The method of claim 7 wherein the organic disulfide is diphenyl disulfide.

12. The method of claim 7 wherein the organic mercaptan is thio-beta-naphthol.

13. The method of claim 9 wherein alkyl mercaptan is n-propyl mercaptan.

14. The method of claim 7 wherein the polybutadiene is dissolved in an aromatic solvent.

References Cited in the file of this patent

Physical Reviews, v. 41 (1932), page 757.
Journal of American Chemical Society, vol. 59 (June 1937), page 1155.